(No Model.) 2 Sheets—Sheet 1.
A. TEN WINKEL.
PRINTING SURFACE AND PROCESS OF MAKING SAME.
No. 522,567. Patented July 3, 1894.
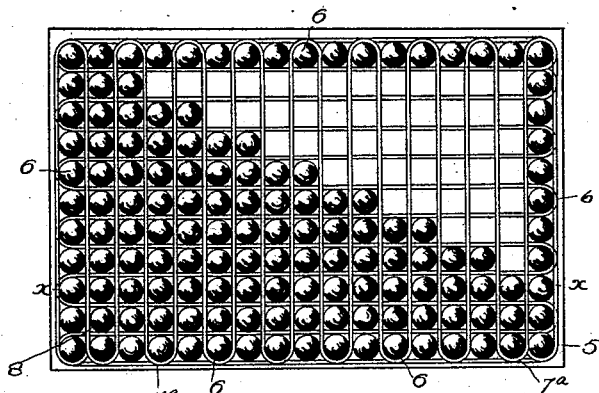
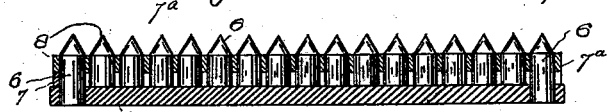
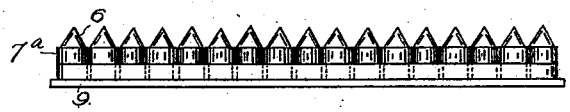
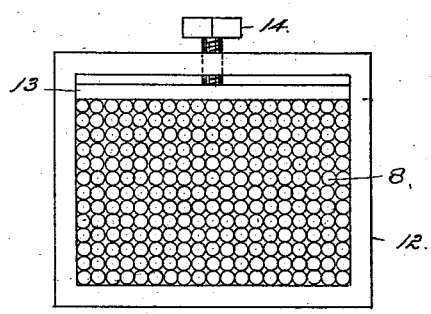
WITNESSES: INVENTOR
A. Ten Winkel
BY
A. J. O'Brien
ATTORNEY (No Model.) 2 Sheets—Sheet 2.
A. TEN WINKEL.
PRINTING SURFACE AND PROCESS OF MAKING SAME.
No. 522,567. Patented July 3, 1894.
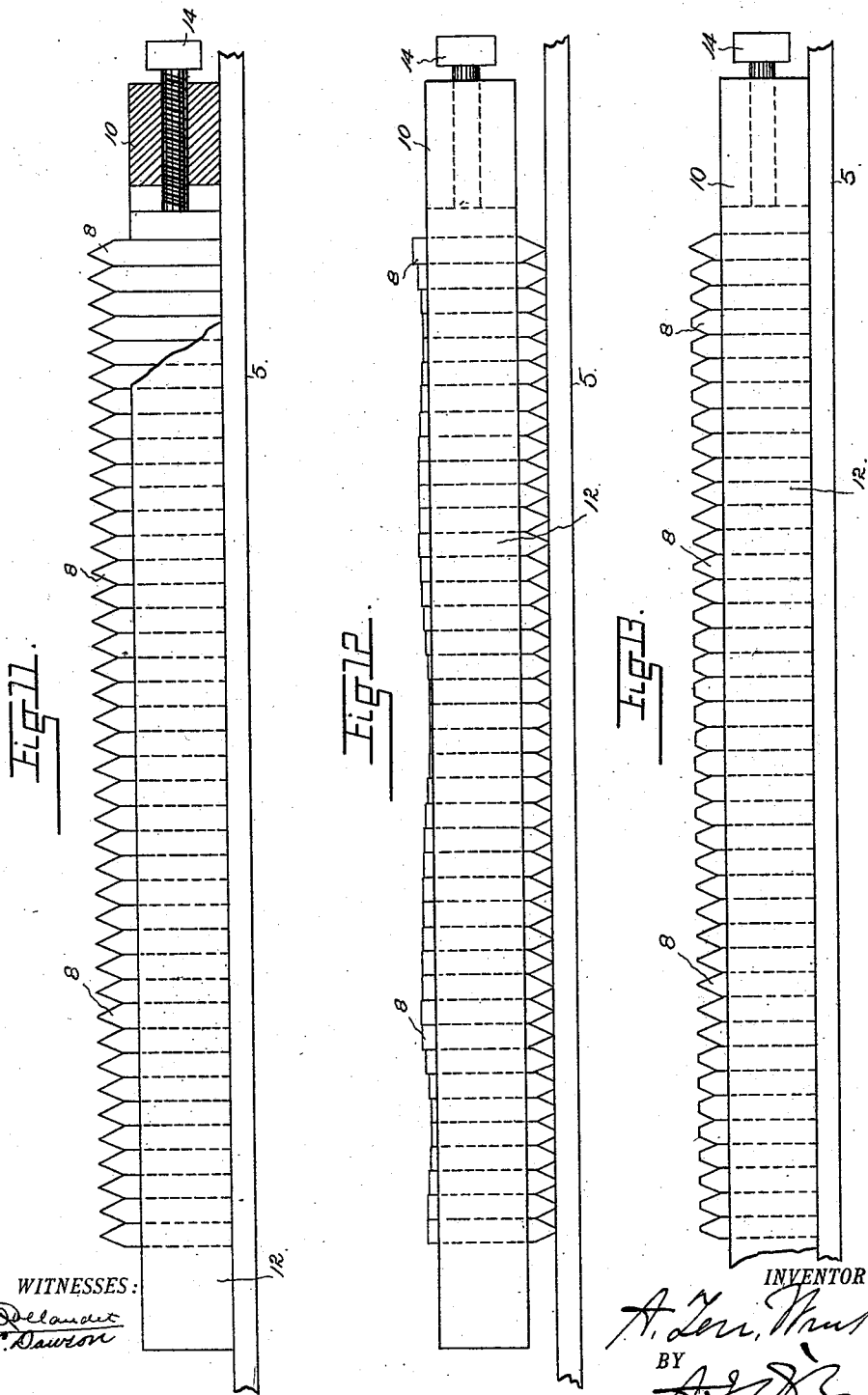

UNITED STATES PATENT OFFICE.

AUGUST TEN WINKEL, OF DENVER, COLORADO.

PRINTING-SURFACE AND PROCESS OF MAKING SAME.

SPECIFICATION forming part of Letters Patent No. 522,567, dated July 3, 1894.

Application filed March 20, 1894. Serial No. 504,377. (No model.)

*To all whom it may concern:*

Be it known that I, AUGUST TEN WINKEL, a citizen of the United States of America, residing at Denver, in the county of Arapahoe and State of Colorado, have invented certain new and useful Improvements in Processes of Producing Printing or Embossing Surfaces; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in processes for producing printing and embossing surfaces.

My chief object is to produce surfaces from which may be obtained dots of any desired shape or design upon half tone plates, or plates for use in what is known as half tone work in the art of reproducing pictures, photographs, &c. The half tone plates may be printed directly from this surface, or obtained indirectly through the mediums of photo-lithographing and lithographing, whence an impression is obtained which may be transferred to said plates.

My process consists in arranging rigid pins, preferably composed of metal, in a flask or case, said pins being originally all of one height, and having their points of any shape or design; cutting or grinding down the face of the pin-mass to give the required result in shading upon the surface to be printed; placing the pin-mass upon its face, and subjecting the back to pressure, whereby the entire face is reduced or brought to the same plane or level, the unevenness of the face of the pin-mass being thus transferred to the back thereof; and then grinding or cutting down the uneven back, until the surface of said back is all in the same plane, and parallel, or approximately parallel with the printing face. The pin-mass is then ready for use, and may be subjected to any required degree of pressure that may be found necessary in printing or embossing.

The points or extremities of the pins which form the printing surface, or the surface to be photo-lithographed, may be formed in any suitable design, as round, straight, triangular, rectangular, pentagonal, hexagonal, heptagonal, octagonal, &c.; and the pins may be arranged in the flask or case in any suitable manner, that is, regularly, in straight or curved lines; or irregularly in groups of any desired design.

Where the pins are employed as a direct printing surface, they must be very small, or of the size they are to appear on the plate; where, however, they are to be photo-lithographed, the pins may be of any convenient size, since the size may be reduced to any extent by the photo-lithographing process.

The pins may be arranged and temporarily held in place by means of a ribbon of some flexible material, preferably metal, as stencil brass, sheet lead, &c., which may be arranged in the form of checker work, forming interstices for the pins, or in the form of a coil, the pins being placed between its convolutions; or the pins may be loosely placed in a case, and crowded to position by means of a set screw engaging a movable plate or bar which is in contact with the pins.

Having thus briefly outlined the nature and the purpose of the invention, I will now proceed to explain the same more in detail, reference being had to the accompanying drawings.

In the drawings, Figure 1 is a plan view of a set of pins placed in interstices formed by crossing parallel lengths of metallic ribbon arranged in planes one above the other. Fig. 2 is a vertical section taken on the line $x$—$x$, Fig. 1. Fig. 3 is a side view of the pins when removed from the rigid base, and provided with a flexible backing for use in direct printing. Fig. 4 is a plan view of a set of pins placed between the convolutions of a coil of flexible metallic ribbon. Fig. 5 is a plan view of the pins placed loosely in a case, and arranged by pressure upon one side. Fig. 6 illustrates some of the shapes or designs which may be chosen for the pin extremities. Fig. 7 illustrates another arrangement of the pins. Figs. 8, 9 and 10 illustrate a modified form of construction, showing a number of thin plates arranged together for printing or embossing lines, as distinguished from points or dots. Fig. 11 is a side elevation of a flask of pins as they appear before they are subjected to the process of grinding or cutting down. Fig.

12 is a similar view showing the pins ground down in places, the flask inverted, and the printing face of the pins all lying in the same plane. Fig. 13 shows the flask in the upright position, both surfaces of the pins lying in parallel planes.

Similar reference characters indicating corresponding parts or elements in the views, let the numeral 5 designate a rectangular metallic base-plate, say one fourth of an inch in thickness, around whose edges, or near the margin, are formed apertures of uniform distance apart, in which are inserted pins 6 of suitable length; for instance, an inch and a fourth in length, so that after passing through the plate 5, they will project an inch above the surface of the same. A flexible ribbon 7, preferably formed of metal, and for example, three eighths of an inch in width, is fastened to one of these corner pins, and passed thence across the plate 5 outside of the other marginal pins, and around the corresponding pin on the opposite side, and thence back parallel with the first ribbon length, and at a distance therefrom, equal to the diameter of the pins, and thence around another pin on the side of beginning and adjacent the starting pin, and thence back and forth across the plate in parallel lengths around the pins on opposite sides of the plate, until the entire surface of the plate is covered from end to end with these parallel lengths of ribbon, after which, the ribbon end is fastened to a pin at one corner of the plate. The extremity of another similar metal ribbon $7^a$, and of the same width as the ribbon 7, is fastened to another corner pin, and in a plane above the first ribbon. This ribbon $7^a$ is then passed across the plate above the first ribbon, and outside of the other marginal pins, and crosswise of, or at right angles to the length of the first or lower ribbon. The ribbon $7^a$ is then passed around the pin 6 opposite the pin located at the point of beginning, and thence back and around the pin adjacent the first pin, and on the same side of the plate; and so on until the entire surface surrounded by the pins 6 is covered with meshes formed of the cross-lengths of ribbon, after which, the loose extremity of the ribbon $7^a$ is fastened to a corner pin. Pins 8, say an inch in length, or of the length which the pins 6 project above the surface of the base plate, are then inserted in these ribbon meshes, the pins being of such size that they will fit more or less tightly in these meshes, where they are held by frictional contact.

Now if the pins are to be used for direct printing, they are removed from the base 5, the outer row of pins 6 being first pushed out of the base, and other pins of the same height as the pins 8, inserted. Now if these pins are loose enough, and it is desirable, the pin-mass may be changed from the rectangular to a diamond shape by pressing upon two of its diagonal corners; then while resting upon the solid base, the surface composed of these pin points is cut or ground down to give the required variety of shading. The pin-mass is then inverted, its face being placed upon the solid base with its back uppermost, and the back subjected to pressure until the face, made uneven by cutting it down, is all made to occupy the same plane. The printing face of the pins may then be inked, when, after placing a rubber blanket 9 upon the back of the mass, it is ready for printing by applying pressure to the rubber blanket, as by means of a roller.

Another arrangement of the pins is illustrated in Fig. 4, in which, the pins 8 are held by a coil $7^c$ of the flexible metal ribbon, the pins 8 being placed between the convolutions of the coil.

Still another arrangement is shown in Fig. 5, in which, the flexible ribbon is not employed, the pins 8 being placed in contact, and held together by a movable piece 13 actuated by a set screw 14.

An arrangement slightly different is shown in Fig. 7; in this case, the pins occupy the inter-pin spaces, since they arrange themselves automatically under pressure, being in direct contact one with another.

The arrangement shown in Figs. 4, 5 and 7 may be used in the same manner as heretofore explained when speaking of the arrangement shown in Figs. 1, 2 and 3. The arrangement shown in Figs. 5 and 7, however, is specially designed for embossing on metal; for this purpose, as well as for ordinary printing, the pin points may be cut down in places, as desired, by grinding or otherwise, to give the desired variety of shading. The printing face is then turned down to contact with a flat surface, and subjected to pressure, until the face extremities of all the pins lie in the same plane or level. The back of this surface, or the opposite extremities of the pins will then be uneven, and may be ground until they all occupy the same plane. The pins composing this printing surface, after being properly cut down, are hardened to prepare them for embossing on metal. The pin-mass is then ready for embossing, and may be subjected to any required degree of pressure, which pressure will be evenly transferred to the printing or embossing face. The frame 12 is of a height less than that of the height of the pins. For metal embossing, this mass of pins held by the frame, as described, is placed face downward on a sheet of steel and subjected to pressure sufficient to force the pin points of its face into the steel plate beneath. The steel plate in engagement with the face of the pins will then contain a series of recesses or depressions of different sizes, according to the size, and of the design, of the ground pin points which formed them. This plate is then inked with transfer ink, applied with a dauber, and an impression taken therefrom on transfer paper, which impression is then transferred to a plate of glass, copper, or any other desired material. This plate with its transfer ink, is then etched by the use of acid, which eats away the parts not inked, leaving the inked parts in relief; I then have a plate with a relief surface exactly the reverse of the original pin point surface. The transfer ink is then washed off from this relief surface, when the plate is ready for printing, either from the relief or etched part of the surface.

If it is desired to print from the relief surface, the ink is applied with a roller; if from the etched or depressed part of the surface, the ink is applied by the use of a dauber. It will thus be seen that the manner of inking determines the result of the print.

Another construction is shown in Figs. 8, 9 and 10, and composed of thin plates having edges more or less sharp, according as the surface is more or less cut down to get the required degree of shading. This construction is for embossing or printing lines instead of points or dots. In Figs. 8 and 10, the printing plates are shown straight; while in Fig. 9, these plates are curved.

In Figs. 11, 12 and 13, I have illustrated three stages of my improved process, namely; the pins before grinding or cutting down; the pins after grinding, the flask being inverted and the printing surface of the pins all occupying the same plane, the backs being uneven; and finally, the pins are shown in the upright position with both surfaces parallel.

Having thus described my invention, what I claim is—

1. The process herein described for producing a printing or embossing surface, which process consists in arranging rigid pieces in a mass, said pieces having points of any design, cutting down the face of the pieces to give the shading required, reducing this face to the same plane or level, and then cutting down the back until the two surfaces are parallel, or approximately parallel, substantially as described.

2. A printing or embossing surface of the character described, said surface being composed of rigid pieces having their printing extremities (which may be of any design) cut down unequally to give the shading required, and all lying in the same plane, as and for the purpose set forth.

In testimony whereof I affix my signature in the presence of two witnesses.

AUGUST TEN WINKEL.

Witnesses:
G. J. ROLLANDET,
CHAS. E. DAWSON.